United States Patent
Jamshidi et al.

(10) Patent No.: US 9,241,359 B1
(45) Date of Patent: Jan. 19, 2016

(54) DELAYED AUTHENTICATION FOLLOWING A RADIO LINK FAILURE

(71) Applicant: Sprint Communications Company L.P., Overland Park, KS (US)

(72) Inventors: Talat Jamshidi, Leawod, KS (US); Saravana Kumar Velusamy, Olathe, KS (US); Rajat Kumar, Kansas City, MO (US); Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/184,347

(22) Filed: Feb. 19, 2014

(51) Int. Cl.
*H04W 76/02* (2009.01)

(52) U.S. Cl.
CPC .................. *H04W 76/021* (2013.01)

(58) Field of Classification Search
CPC .................................................. H04W 76/02
USPC ........................ 455/410–411, 432.1, 435.1, 455/414.2–414.3
See application file for complete search history.

(56) References Cited

U.S. PATENT DOCUMENTS

| | | | | |
|---|---|---|---|---|
| 5,497,504 A | * | 3/1996 | Acampora et al. | 455/436 |
| 2003/0166397 A1 | * | 9/2003 | Aura | 455/410 |
| 2014/0057613 A1 | * | 2/2014 | Ezell | 455/417 |

* cited by examiner

*Primary Examiner* — Brandon Miller

(57) ABSTRACT

Systems, methods, and computer-readable media for delaying authentication of a mobile device following a radio link failure, and thereby enabling the mobile device to quickly attach to a current control component associated with a network, are provided. The method includes receiving, at the current control component, a message indicating that the radio link failure occurred at a previous control component. Upon receiving the message, the mobile device is attached to the current control component. Authentication of the mobile device is delayed such that authentication of the mobile device is initiated subsequent to the attaching of the mobile device to the current control component. This delayed authentication ensures that a communication session in which the mobile device was engaged prior to the radio link failure is uninterrupted.

18 Claims, 5 Drawing Sheets

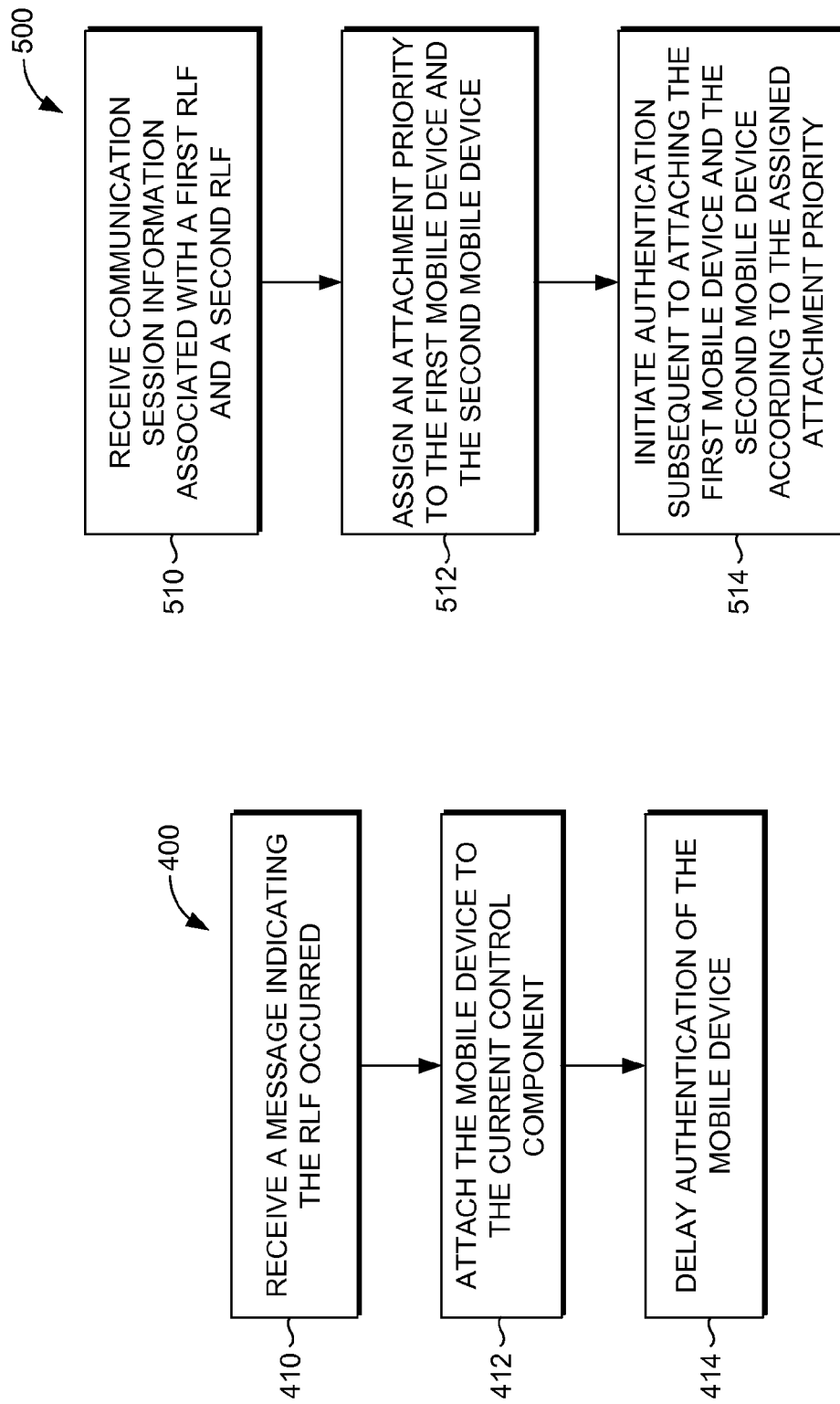

DELAYED AUTHENTICATION FOLLOWING A RADIO LINK FAILURE

SUMMARY

In brief, and at a high level, this disclosure describes, among other things, delaying authentication of a mobile device after a radio link failure. A current control component associated with a network receives a message indicating that a radio link failure occurred at a previous control component. The authentication of the mobile device is delayed such that the mobile device is permitted to attach to the current control component before authentication of the mobile device is initiated. This enables the mobile device to quickly attach to the current control component after the radio link failure and ensures that a communication session in which the mobile device was engaged prior to the radio link failure is uninterrupted.

This summary is provided to introduce a selection of concepts in a simplified form that are further described in the detailed description below. This summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein, and wherein:

FIG. 4 provides a first exemplary method for delaying authentication of a mobile device in accordance with an embodiment of the present invention;

FIG. 5 provides a second exemplary method for delaying authentication of a mobile device in accordance with an embodiment of the present invention.

DETAILED DESCRIPTION

Figure 1:
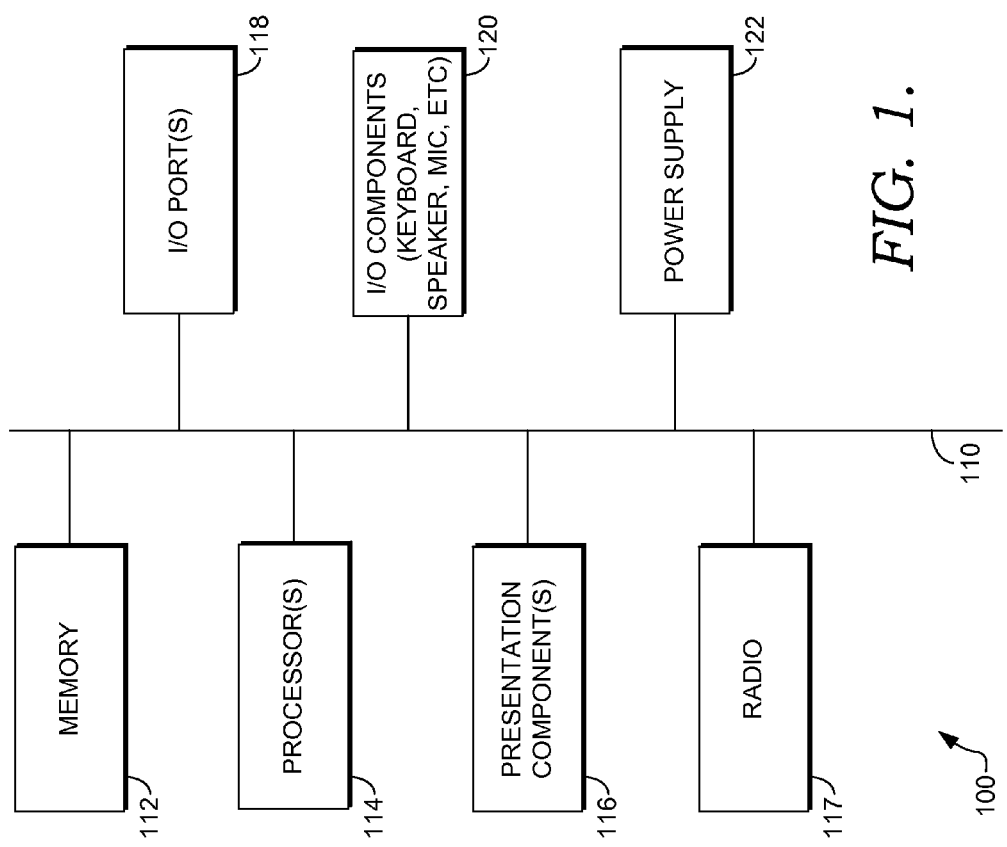
FIG. 1 depicts an exemplary computing device according to embodiments of the present invention.

The subject matter of the present invention is described with specificity herein to meet statutory requirements. However, this description is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and "block" might be used herein to connote different elements of the methods employed, the terms should not be interpreted as implying any particular order among or between various steps herein disclosed unless and except when the order of individual steps is explicitly described.

Embodiments of the present invention relate to systems, methods, and computer-readable media for, among other things, delaying authentication of a mobile device after the mobile device experiences a radio link failure, and thereby enabling the mobile device to quickly attach to another control component associated with a network. Utilizing embodiments hereof, following the radio link failure at a first control component, the authentication of a mobile device may be delayed such that the authentication is initiated subsequent to attaching the mobile device to a second control component. This enables the mobile device to quickly attach to the second control component and ensures that a communication session in which the mobile device was engaged prior to the radio link failure is uninterrupted.

A radio link failure occurs when a signal associated with a connection between a mobile device and a first control component, such as a first eNodeB in an LTE network, drops abruptly, or when the first control component fails. When a radio link failure occurs at the first control component, a second control component, such as a second eNodeB, to which the mobile device may attach is identified. Typically, before the mobile device attaches to the second eNodeB such that the mobile device can send and receive data on the network, the mobile device is first authenticated. This authentication requires time, and can interrupt a time-sensitive communication session in which the mobile device is engaged at the time of the radio link failure. The present invention, however, among other things, provides for an uninterrupted communication session during a radio link failure by delaying the authentication of the mobile device until after the mobile device is attached to the second control component. In this way, the mobile device is able to quickly attach to the second control component and resume sending and receiving data on the network, such that a communication session, including a time-sensitive communication session, is uninterrupted by the radio link failure.

Further, if multiple mobile devices experience radio link failures within a similar time frame, the present invention provides not only for the delayed authentication of the multiple mobile devices, but also for the prioritization of the attachment of the multiple devices to the second control component. Thus, a mobile device engaged in a highly time-sensitive communication session may be assigned a first attachment priority, while a mobile device engaged in a communication session that is not time sensitive is assigned a second, lower attachment priority. As such, the mobile device assigned the first priority will attach to the second control component prior to the mobile device assigned the second, lower priority. This prioritization enhances the quality of user experience.

Accordingly, in one aspect, the present invention is directed to a method for delaying authentication of a mobile device after a radio link failure, thereby enabling the mobile device to quickly attach to a current control component associated with a network. The method includes, at the current control component, receiving a message indicating that the radio link failure occurred at a previous control component. Upon receiving the message, the mobile device is attached to the current control component. The method further includes delaying authentication of the mobile device such that authentication of the mobile device is initiated subsequent to the attaching of the mobile device to the current control component. This method for delaying authentication ensures that a communication session in which the mobile device was engaged prior to the radio link failure is uninterrupted.

In another aspect, the present invention is directed to computer-readable media having computer-executable instructions embodied thereon that, when executed, perform a method for delaying authentication of a first mobile device and a second mobile device after radio link failures occur. The method includes, upon a first radio link failure between a first control component and the first mobile device and a second radio link failure between the first control component and the second mobile device, receiving at a second control component communication session information associated with the first radio link failure and the second radio link failure. The method further includes, based on the communication session information, assigning an attachment priority to the first mobile device and the second mobile device. Additionally, the method includes delaying authentication of the first mobile device and the second mobile device such that authentication is initiated subsequent to attaching the first mobile device and the second mobile device to the second control component according to the assigned attachment priority.

In yet another aspect, a system for delaying authentication of a mobile device after a radio link failure occurs is provided. The system includes a management component and a current control component. The current control component receives a first message from a mobile device, the first message including an indication of the radio link failure at a previous control component. The current control component also receives a second message from the management component, the second message including an identity of a network component associated with a communication session at the mobile device prior to the radio link failure. Further, the current control component attaches the mobile device to the current control component, and the current control component initiates authentication of the mobile device after attaching the mobile device to the current control component in order to provide continuity in the communication session.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

BTS Base Transceiver Station
3G Third Generation Mobile Telecommunications
4G Fourth Generation Mobile Telecommunications
CD-ROM Compact Disk Read Only Memory
CDMA Code Division Multiple Access
GPRS General Packet Radio Service
GSM Global System for Mobile communications: originally from Groupe Special Mobile
DVD Digital Versatile Discs
EEPROM Electrically Erasable Programmable Read Only Memory
eNodeB Evolved Node B
HLR Home Location Register
HSDPA High-Speed Downlink Packet Access
LTE Long Term Evolution
PC Personal Computer
PDA Personal Digital Assistant
RAM Random Access Memory
ROM Read Only Memory
TDMA Time Division Multiple Access
UMTS Universal Mobile Telecommunications System
VOIP Voice Over Internet Protocol
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings, in general, and initially to FIG. 1, in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies, and multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for delaying authentication of a mobile device after a radio link failure. Accordingly, a current control component associated with a network receives a message indicating that the radio link failure occurred at a previous control component. This message triggers a delayed authentication of the mobile device at the current control component. Accordingly, the mobile device attaches to the current control component before authentication of the mobile device is initiated. Authentication of the mobile device occurs after the attachment. In this way, the mobile device is quickly attached to the current control component in order to ensure that a communication session in which the mobile device was engaged prior to the radio link failure is uninterrupted. Without the delayed authentication, the time required to attach the mobile device to a current control component could affect a communications session in progress at the device during the RLF. For example, a voice call or other time-sensitive application could be interrupted.

Figure 2:
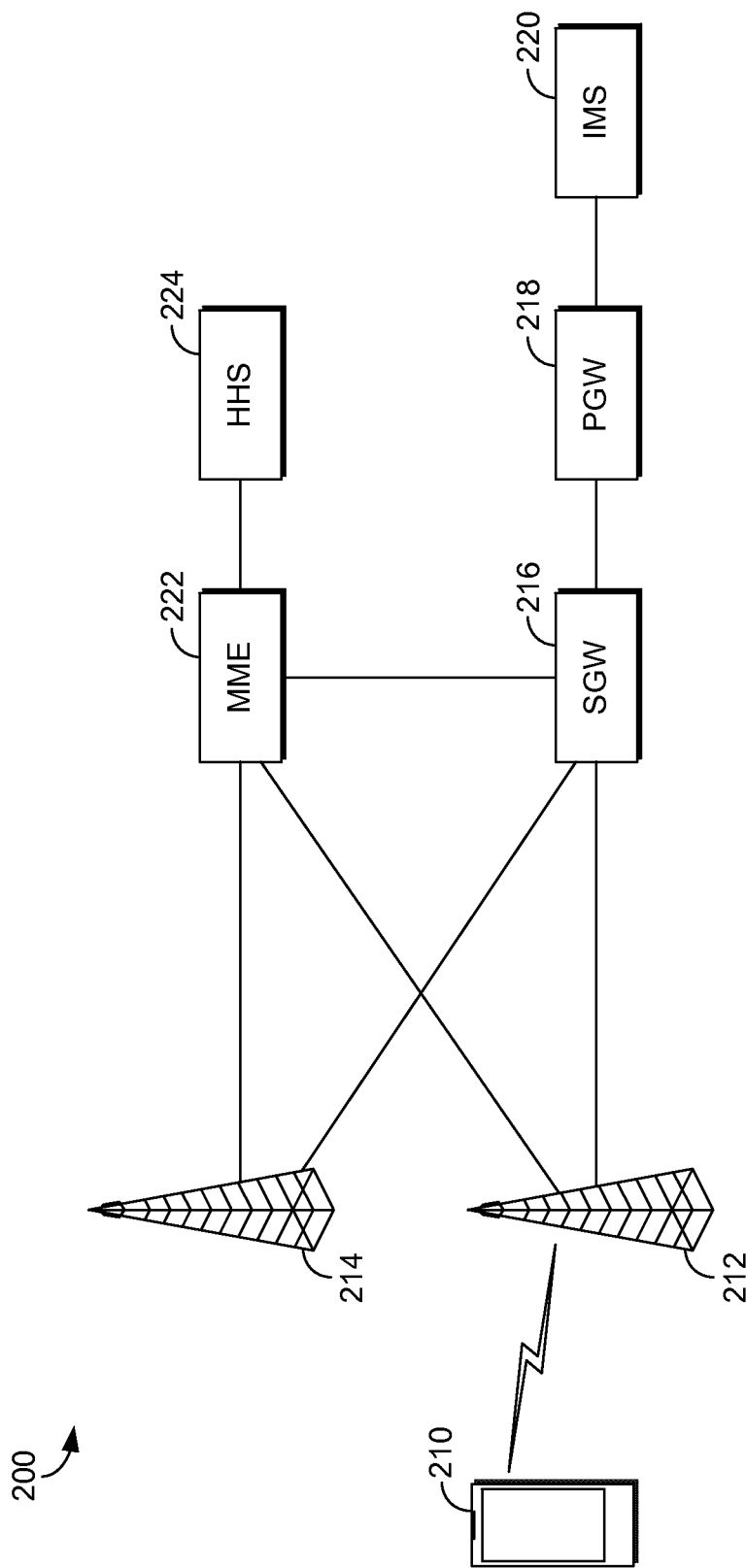
FIG. 2 is a schematic view of an exemplary network environment suitable for use in implementing embodiments of the present invention.

FIG. 2 provides an exemplary environment suitable for use in implementing embodiments of the present invention. Such an environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a mobile device 210 is communicatively coupled to one or more components of a network. In embodiments, the network is a telecommunications network or networks, or a portion thereof. A telecommunications network might include an array of devices or components, some of which are not shown so as to not obscure more relevant aspects of the invention. Components such as terminals, links, and nodes (as well as other components) can provide connectivity in some embodiments. The network can include multiple networks, as well as being a network of networks, but is shown in a more simple form so as to not obscure other aspects of the present invention. In embodiments, the network can be associated with a telecommunications provider that provides services to mobile devices. The network can be any communication network providing voice services, data services, or both, such as, for example, a 1x circuit voice, a 3G network (e.g., CDMA, CDMA2000, WCDMA, GSM, UMTS), or a 4G network (e.g., WiMAX, LTE, HSDPA, LTE Advanced).

The mobile device 210 is configured to, among other things, communicate with one or more components of the network. While the network, as mentioned above, can be any communication network providing some combination of voice and data services, FIG. 2 illustrates an embodiment of the invention including an LTE network, which, in turn, includes a number of LTE network components. Specifically, the LTE network illustrated in FIG. 2 includes two radio towers, radio tower 212 and radio tower 214, each of which include a control component. In embodiments, the control component is an eNodeB. An eNodeB is the hardware component of the LTE network that communicates with mobile devices, such as the mobile device 210. Besides being in communication with the mobile device 210, the eNodeB is also in communication with other network components, such as the Mobility Management Entity (MME) 222 and the Serving Gateway (SGW) 216. The MME 222 is responsible for, among other things, tracking and paging procedures for mobile devices, as well as authenticating and authorizing mobile devices. Authentication is the process by which the network confirms the identity or credentials associated with a mobile device. Authentication involves interaction between the MME 222 and the Home Subscriber Server (HSS) 224, which is a database containing user-related and subscription-related information. The MME 222 also chooses the SGW 216 for the mobile device 210. The SGW 216 routes and forwards data packets within the LTE network. The Packet Data Network Gateway (PGW) 218 is responsible for, among other things, allocating an IP address to the mobile device 210. The IP Multimedia Subsystem (IMS) 220 controls multimedia applications, such as IP-based telephony services, in the LTE network. The preceding discussion provides only a brief overview of some of the functions performed by various network components. These components may perform functions in addition to those described, and, further, the LTE network may include additional components that are not discussed above and not depicted in FIG. 2.

At a high level, in order for the mobile device 210 to utilize services and send or receive data on the LTE network, it must connect, or attach, to the network. Thus, the mobile device 210 initially sends a message including an attach request to the network, via the radio tower 212. Upon receiving the attach request, the MME 222 and HSS 224 authenticate the mobile device 210 before attachment of the mobile device 210 is completed. When the mobile device 210 has been authenticated and has successfully attached to the network, a data path is created among the mobile device 210, radio tower 212, SGW 216, and PGW 218. The mobile device 210 is provided an IP address and is able to send and receive data on the LTE network. At this point, the mobile device 210 is associated with the radio tower 212 and the corresponding eNodeB; the mobile device 210 may thus be described as being attached to the radio tower 212, or attached to the eNodeB of the radio tower 212.

When the mobile device 210 is attached to the radio tower 212, a signal is associated with that connection. The strength of that signal may fade as the mobile device 210 moves outside of the coverage area associated with the radio tower 212. When such signal fading occurs, the mobile device 210 may be transferred, or handed over, to a neighboring radio tower, such as radio tower 214. For example, in a typical handover scenario, the eNodeB of radio tower 212, the "source eNodeB" in this example, may recognize that the signal associated with the mobile device 210 is fading, and may further recognize that the eNodeB of radio tower 214, the "target eNodeB" in this example, is a better option for the mobile device 210. The source eNodeB can determine that the target eNodeB is a better option, because the source eNodeB is aware of its neighboring eNodeBs, and because the source eNodeB also knows a signal strength between the target eNodeB and the mobile device 210. Based on this determination, the source eNodeB then notifies the MME 222 that the mobile device 210 needs to be handed over to the target eNodeB. The MME 222 determines whether either the MME 222 or SGW 216 currently associated with the mobile device 210 needs to be reselected for purposes of the handover. If so, the MME 222 selects the target MME and target SGW. In the example illustrated in FIG. 2, such relocation is not required, and therefore only a single MME and single SGW are depicted. The MME 222 sets up SGW 216 to transfer a data path for the mobile device 210 from the source eNodeB to the target eNodeB. Then, the mobile device 210 is handed over from the source eNodeB to the target eNodeB. If the mobile device 210 is engaged in a communication session at the source eNodeB at the time the handover is to occur, data associated with the communication session is sent through an external link to the target eNodeB until the handover is complete. In this way, a seamless handover is provided, such that the mobile device 210 enjoys an uninterrupted communication session during its transition from the source eNodeB to the target eNodeB.

The description above relates to a typical handover scenario, where a signal associated with a connection between the mobile device 210 and the radio tower 212 fades gradually, such that various components of the LTE network recognize the need for a handover and plan accordingly. Sometimes, however, the signal drops abruptly, such as when a user enters an elevator, basement, or parking garage, or when a user goes over a large hill, behind which there is no network coverage associated with the radio tower 212. This abrupt drop in signal happens quickly, such that the mobile device 210 and the LTE network cannot proceed through the seamless handover process discussed above. This occurrence is called a radio link failure (RLF). An RLF may also occur when the radio tower 212, or the eNodeB associated with the radio tower 212, fails for some reason. This failure prevents the eNodeB from servicing any mobile device, and as a result, multiple mobile devices, including the mobile device 210, may experience the RLF. Again, in this situation, the RLF happens quickly, thereby precluding the seamless handover process outlined above.

When the radio tower 212 experiences an RLF that interrupts the signal associated with the connection between the radio tower 212 and the mobile device 210, the mobile device 210 is left searching for the next best radio tower, which, in FIG. 2, is the radio tower 214. In contrast to the seamless handover scenario discussed above, where the radio tower 214 is made aware that the mobile device 210 will be handed over to the radio tower 214, here, the radio tower 214 is not expecting the mobile device 210 to be transferred to the radio tower 214. Further in contrast to the seamless handover scenario, here, the radio tower 214 has no information regarding any communication session in which the mobile device 210 was engaged at the time of the RLF. Thus, mobile device 210 must proceed through the entire authentication and attachment process at the radio tower 214, and must receive a new IP address. This process can be time consuming. As a consequence of the time consumed and the changed IP address, a time-sensitive or IP-sensitive communication session at the mobile device 210 may be interrupted. For example, a voice or video communication session may be dropped or interrupted.

Embodiments of the present invention enhance the quality of user experience by providing for a fast attachment of the mobile device 210 to the radio tower 214 following an RLF at the radio tower 212. This fast attachment minimizes the interruption of time-sensitive and IP-sensitive communication sessions that are in progress at the mobile device 210 during the RLF. When the mobile device 210 loses its connection to the radio tower 212 due to an RLF, the next best radio tower is identified. In one embodiment, the next best radio tower may be geographically located near the mobile device 210. In the example illustrated by FIG. 2, the next best radio tower is the radio tower 214. In embodiments, the mobile device 210 identifies the radio tower 214. Then, the radio tower 214 receives an RLF message indicating that an RLF occurred. In embodiments, the mobile device 210 sends this RLF message to the radio tower 214. The RLF message triggers a delayed authentication of the mobile device 210 at the radio tower 214, such that the mobile device 210 is attached to the radio tower 214 prior to the radio tower 214 authenticating the mobile device 210. Such delayed authentication is permitted, because the radio tower 214 has been notified that an RLF occurred at another radio tower to which the mobile device 210 was previously attached, and, therefore, it can be assumed that the mobile device 210 was previously authenticated. Thus, the mobile device 210 is attached to the radio tower 214 without any prior authentication by the radio tower 214. After the mobile device 210 is attached to the radio tower 214 such that the mobile device 210 can send and receive data on the network, then authentication of the mobile device 210 is initiated. If the mobile device 210 is authenticated, then the mobile device 210 is permitted to remain attached to the radio tower 214 and can continue sending and receiving data. If the mobile device is not authenticated, however, then the mobile device is detached from the radio tower 214 and cannot continue sending and receiving data.

The delayed authentication discussed above is triggered when radio tower 214 receives an RLF message indicating that an RLF occurred. In embodiments, the RLF message may include additional information relevant to delaying authentication. The RLF message may include the identity of the radio tower to which the mobile device 210 was attached when the RLF occurred. In the example illustrated in FIG. 2, the RLF message would include the identity of the radio tower 212. The RLF message may further include quality of service information associated with the mobile device 210 when the RLF occurred. For example, the RLF message might indicate that certain services were active on the mobile device 210 at the time of the RLF. Such services might include voice, conversational video, streaming video, gaming, internet browsing, or other types of services. The RLF message could then indicate the level of quality required to continue using such services. For example, a voice or video call may require a relatively high quality, while general internet browsing may receive a lower, "best effort" level of quality. The quality of service information may also include a carrier identity associated with the device.

Based on the quality of service information, the RLF message may further include a connection category. In embodiments, the connection category is used to prioritize the attachment of multiple devices affected by an RLF. This will be discussed in greater detail with respect to FIG. 3, but generally, with respect to FIG. 2, the connection category indicates how quickly the mobile device 210 needs to be attached to the radio tower 214, based on the quality of service information associated with the mobile device 210. For example, on a scale of 1 to 3, a connection category 1 might indicate the mobile device 210 requires the fastest attachment possible, such as when the mobile device 210 is engaged in a voice or video call at the time of the RLF. A connection category 3, on the other hand, might indicate that the mobile device 210 does not require an especially fast attachment, such as when the mobile device 210 is engaged in general internet browsing. In this instance, in some embodiments, the authentication of mobile device 210 might not be delayed.

To summarize the above discussion, the radio tower 214 may receive some combination of the following information via the RLF message: the RLF occurred, the identity of the radio tower 212, the quality of service information for the mobile device 210, and the connection category. The radio tower 214 may require additional information, however, in order to provide an uninterrupted, IP-sensitive communication session at the mobile device 210. An IP-sensitive communication session is a communication session that will be interrupted by a change in the IP address associated with the mobile device 210. For example, a video call may be interrupted if the IP address associated with the mobile device 210 changes while the call is in progress. To preserve the IP address assigned to the mobile device 210 when it attached to the radio tower 212, and thereby preserve the IP-sensitive communication session at the mobile device 210, the mobile device 210 is associated with the same SGW 216 and PGW 218 with which it was associated when it was attached to the radio tower 212. To accomplish this, the radio tower 214 obtains the identities of the SGW 216 or the PGW 218 with which the mobile device 210 was previously associated. The radio tower 214 can obtain this information in at least two ways, each of which is described below.

First, the radio tower 214 can obtain this information from the radio tower 212, if the radio tower 212 is available to communicate with the radio tower 214. If the RLF was caused by a failure of the radio tower 212, then the radio tower 212 will not be available to communicate, but if the RLF was caused by an abrupt drop in signal between the mobile device 210 and the radio tower 212, then the radio tower 212 may still be able to communicate information to the radio tower 214. In the latter situation, the eNodeB associated with the radio tower 212 can provide information regarding the identity of the SGW 216 or PGW 218 to the eNodeB associated with the radio tower 214. In this way, when the mobile device 210 attaches to the radio tower 214, the mobile device 210 may be associated with the same SGW 216 and PGW 218, and the IP address associated with the mobile device 210 is preserved.

If the radio tower 212 is not available to communicate with the radio tower 214, such as when the RLF is caused by a failure of the radio tower 212, then the radio tower 214 must obtain information regarding the identity of the SGW 216 or PGW 218 elsewhere. The eNodeB associated with the radio tower 214 can obtain this information from the MME 222. The MME 222 has this information, because the MME 222 set up the SGW 216 when the mobile device 210 attached to the radio tower 212. Thus, when the mobile device 210 attaches to the radio tower 214, the mobile device 210 may be associated with the same SGW 216 and PGW 218, and the IP address associated with the mobile device 210 is preserved.

Figure 3:
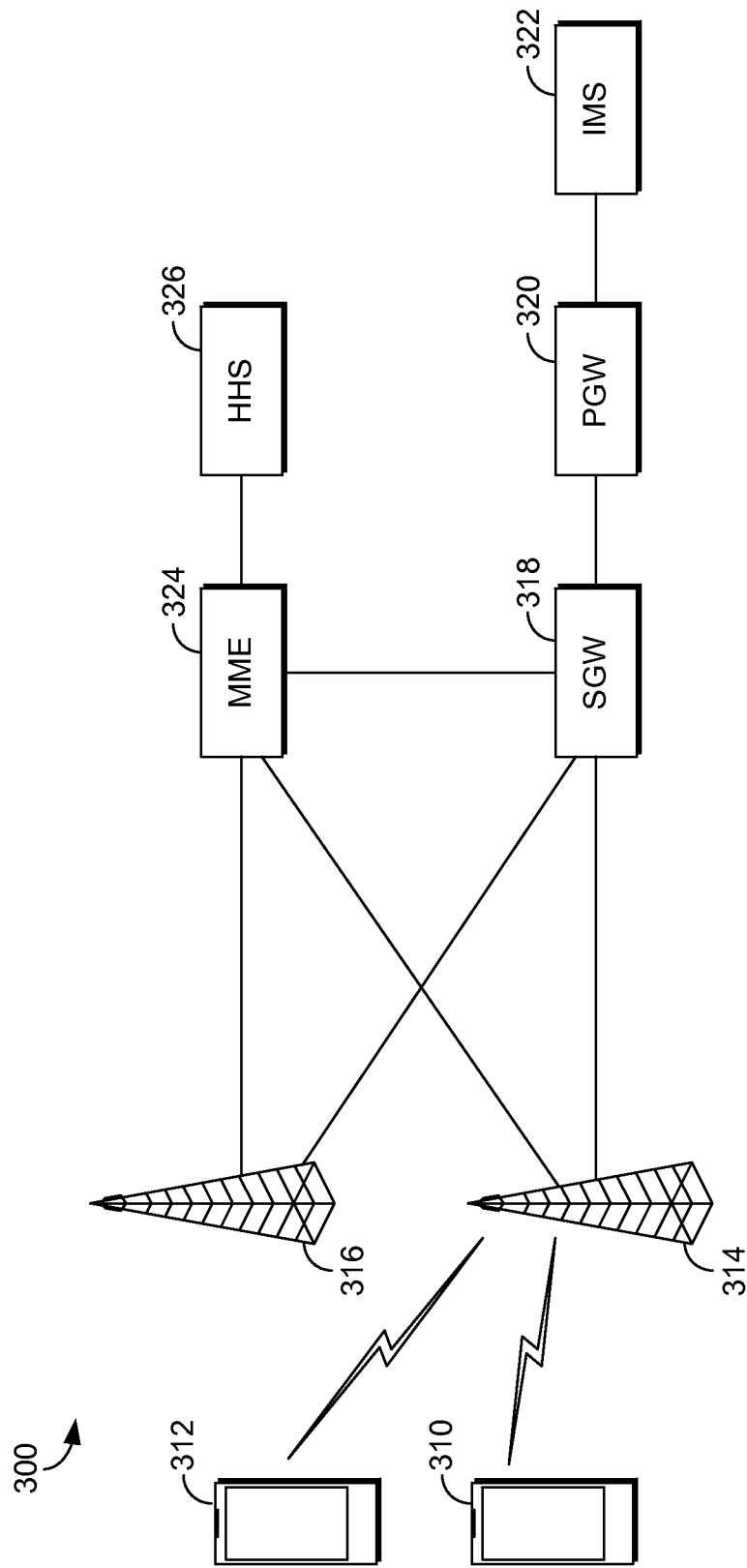
FIG. 3 is a schematic view of an exemplary network environment suitable for use in implementing embodiments of the present invention.

Turning now to FIG. 3, an exemplary environment suitable for use in implementing embodiments of the present invention is provided and designated generally as network environment 300. As in FIG. 2, an LTE network including multiple network components is illustrated. The network components illustrated in FIG. 3 perform functions similar to those described with respect to FIG. 2, and, as such, the description is not repeated here. FIG. 3 further illustrates two mobile devices, mobile device 310 and mobile device 312. Embodiments of the present invention address a scenario involving multiple mobile devices affected by an RLF within a similar time frame. For example, if both mobile device 310 and mobile device 312 are attached to the radio tower 314 when an RLF at the radio tower 314 is caused by a failure of the radio tower 314, then both mobile device 310 and mobile device 312 will need to attach to a neighboring radio tower, such as radio tower 316. When the radio tower 316 receives a message indicating that the RLF occurred, delayed authentication will be triggered for both mobile device 310 and mobile device 312. In some situations, however, one mobile device may require a faster attachment than the other mobile device. Thus, the present invention further provides for the prioritization of attachment among multiple devices having experienced an RLF.

In embodiments, prioritizing the attachment of multiple devices is based on the quality of service information and the connection category associated with a device. In FIG. 3, for example, suppose the mobile device 310 is engaged in a voice call when the RLF occurs at the radio tower 314, while the mobile device 312 is engaged in a general internet browsing session at the time of the RLF. In embodiments, both devices send messages to the radio tower 316 indicating that the RLF occurred. In response, the radio tower 316 delays authentication of both devices. The message from the mobile device 310 includes quality of service information corresponding to a voice call, as well as a connection category based on that quality of service information. For example, the connection category might be a 1. The message from the mobile device 312, however, includes quality of service information corresponding to an internet browsing session, as well as a corresponding connection category, which may, for example, be a 3. Based on this information, in embodiments, radio tower 316 assigns an attachment priority to the mobile device 310 and mobile device 312, with the priority assigned to the mobile device 310 being higher than the priority assigned to the mobile device 312, based on the fact that the mobile device 310 requires a faster attachment than the mobile device 312 in order to provide continuity in the ongoing voice call at the mobile device 310. As mentioned above, the quality of service information may also include a carrier identity associated with a mobile device. This enables a particular carrier to assign a higher attachment priority to its own customers, thereby providing its customers with a positive user experience.

Turning now to FIGS. 4 and 5, the present invention provides a method for delaying authentication of a mobile device to enable fast attachment of the mobile device during an RLF. FIG. 4 illustrates a number of steps that may be used to implement a method 400, in accordance with embodiments of the present invention. At block 410, a current control component receives an RLF message indicating that the RLF occurred at a previous control component. In embodiments, a control component performs functions similar to those performed by a base station, such as an eNodeB (eNodeB associated with the radio tower 212 of FIG. 2) in an LTE network. The RLF message is sent from the mobile device, in some embodiments. In further embodiments, the RLF message includes an identity of the previous control component to which the mobile device was attached prior to the RLF. The message may further include, in embodiments, a quality of service and a connection category associated with the mobile device. The quality of service may be based on at least one of a service utilized by the mobile device and a carrier associated with the mobile device. The connection category may be based on the quality of service. In embodiments, a priority is assigned to the mobile device based on the connection category associated with the mobile device.

At block 412, upon receiving the message at the current control component, the mobile device is attached to the current control component. In embodiments, the attaching of the mobile device to the current control component is prioritized according to the assigned priority mentioned above. At block 414, authentication of the mobile device is delayed such that the authentication is initiated subsequent to the attaching of the mobile device to the current control component. This delayed authentication ensures that a communication session in which the mobile device was engaged prior to the RLF is uninterrupted.

In additional embodiments, the previous control component provides to the current control component an identity of a network component that was associated with the mobile device during the communication session in which the mobile device was engaged prior to the RLF. This information enables preservation of the IP address associated with the mobile device during the communication session, such that the IP address is unchanged. The network component associated with the mobile device, in embodiments, includes at least one of an SGW and PGW. In other embodiments, a management component provides the identity of the network component associated with the mobile device during the communication session in which the mobile device was engaged prior to the RLF. The management component, in embodiments, performs functions similar to those performed by an MME, such as the MME 222 of FIG. 2. In some embodiments, the management component is associated with the previous control component and the current control component.

In embodiments, the method illustrated in FIG. 4 provides continuity in a communication session in which the mobile device was engaged prior to the RLF. Providing such continuity includes, in embodiments, associating the mobile device with the network components associated with the communication session at the mobile device prior to the RLF. In embodiments, the mobile device is further provided with the quality of service associated with the mobile device prior to the RLF.

Turning now to FIG. 5, a series of steps for delaying authentication of a first mobile device and a second mobile device after RLFs occur, in accordance with embodiments of the present invention, is illustrated as method 500. At block 510, upon a first RLF between a first control component and the first mobile device and a second RLF between the first control component and the second mobile device, communication session information associated with the first RLF and the second RLF is received at the second control component. In embodiments, receiving the communication session information includes receiving a first message from the first mobile device and a second message from the second mobile device. The first message includes an identity associated with the first control component, a quality of service associated with the first mobile device, and a first connection category associated with the first mobile device. The second message includes the identity associated with the first control component, a second quality of service associated with the second mobile device, and a second connection category associated with the second mobile device. In further embodiments, the first quality of service is based on at least one of a first service being utilized by the first mobile device when the first RLF occurs and a first carrier associated with the first mobile device. In such embodiments, the second quality of service is based on at least one of a second service being utilized by the second mobile device when the second RLF occurs and a second carrier associated with the second mobile device.

At block 512, based on the communication session information, an attachment priority is assigned to the first mobile device and the second mobile device. In embodiments, assigning the attachment priority includes assigning a first priority to the first mobile device based on the first connection category, and assigning a second priority to the second mobile device based on the second connection category. In embodiments, the second priority is lower than the first priority. Then, according to the first priority and the second priority, the attaching of the first mobile device and the second mobile device is prioritized, such that the first mobile device is attached to the second control component before the second mobile device is attached to the second control component.

At block 514, the authentication of the first mobile device and the second mobile device is delayed such that authentication is initiated subsequent to attaching the first mobile device and the second mobile device to the second control component according to the assigned attachment priority.

It will be understood by those of ordinary skill in the art that the order of steps shown in the method 400 of FIG. 4 and method 500 of FIG. 5 is not meant to limit the scope of the present invention in any way and, in fact, the steps may occur in a variety of different sequences within embodiments hereof. Any and all such variations, and any combination thereof, are contemplated to be within the scope of embodiments of the present invention.

Figure 6:
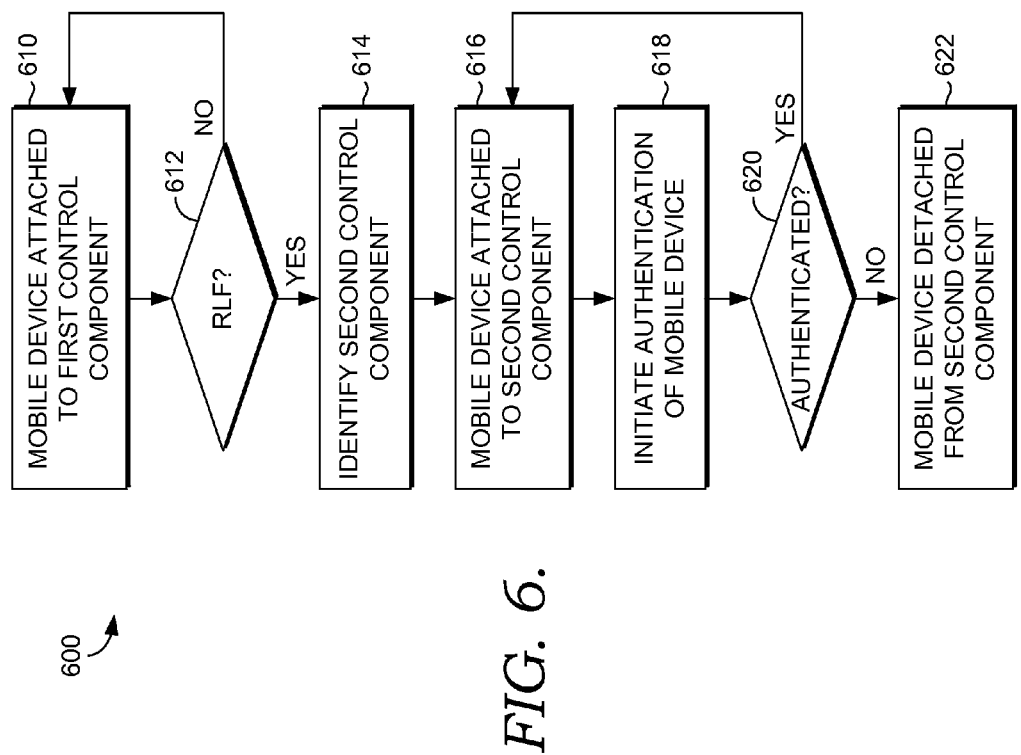
FIG. 6 is a flow diagram relevant to implementing embodiments of the present invention.

Turning now to FIG. 6, a flow diagram 600 is illustrated as an aid to understanding embodiments of the present invention. At block 610, a mobile device is attached to a first control component. At block 612, an inquiry is made as to whether an RLF has occurred at the first control component. If not, the mobile device remains attached to the current control component. If an RLF has occurred, then a second control component is identified at block 614. The mobile device is attached to the second control component at block 616. After attachment, at block 618, authentication of the mobile device is initiated. If the network verifies the identity and credentials of the mobile device, and if the mobile device otherwise satisfies any additional authentication requirements, then the mobile device is deemed to be authenticated at block 620. As such, the mobile device remains attached to the second control component and is permitted to continue sending and receiving data on the network. If, at block 620, the mobile device is deemed not to have been authenticated for some reason, then the mobile device is detached from the second control component at block 622 and is no longer permitted to send and receive data on the network.

The delayed authentication of the present invention strikes the appropriate balance between requiring authentication before attachment, which can negatively impact the quality of user experience, and bypassing authentication altogether. Delayed authentication, as opposed to bypassed authentication, is important for the purpose of preventing fraud. If a radio tower bypassed authentication of mobile devices in response to RLF messages, then users could circumvent the authentication process by creating messages that imitate the RLF messages. This would enable users to fraudulently attach to a radio tower and send and receive data on the network. The delayed authentication of the present invention addresses concerns relating to such fraud.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for delaying authentication of a mobile device after a radio link failure, the method comprising:
    at a current control component, receiving a message indicating that the radio link failure occurred at a previous control component, the message including an identity of the previous control component to which the mobile device was attached prior to the radio link failure;
    in response to receiving the message, attaching the mobile device to the current control component; and
    based on the radio link failure, delaying authentication of the mobile device such that authentication of the mobile device is initiated subsequent to the attaching of the mobile device to the current control component to ensure that a communication session in which the mobile device was engaged prior to the radio link failure is uninterrupted.

2. The method of claim 1, wherein the message received at the current control component is received at the current control component from the mobile device.

3. The method of claim 1, wherein the previous control component provides to the current control component an identity of a network component that was associated with the mobile device during the communication session in which the mobile device was engaged prior to the radio link failure, such that an IP address associated with the mobile device during the communication session is unchanged.

4. The method of claim 3, wherein the network component associated with the mobile device comprises at least one of a Serving Gateway and a Packet Data Network Gateway.

5. The method of claim 1, wherein a management component associated with the previous control component and the current control component provides an identity of a network component associated with the mobile device during the communication session in which the mobile device was engaged prior to the radio link failure, the network component associated with the mobile device comprising at least one of a Serving Gateway and a Packet Data Network Gateway.

6. The method of claim 1, wherein the message further includes a quality of service associated with the mobile device and a connection category associated with the mobile device, wherein the connection category is based on the quality of service.

7. The method of claim 6, wherein the quality of service associated with the mobile device is based on at least one of a service utilized by the mobile device and a carrier associated with the mobile device.

8. The method of claim 6, further comprising assigning a priority to the mobile device, the assigned priority being based on the connection category associated with the mobile device.

9. The method of claim 8, further comprising, according to the assigned priority, prioritizing the attaching of the mobile device to the current control component.

10. Non-transitory computer-readable media having computer-executable instructions embodied thereon that, when executed, perform a method for delaying authentication of a first mobile device and a second mobile device after radio link failures occur, the method comprising:
    based on a first radio link failure between a first control component and the first mobile device and a second radio link failure between the first control component and the second mobile device, receiving at a second control component communication session information associated with the first radio link failure and the second radio link failure, the communication session information including an identity associated with the first control component to which the first mobile device and the second mobile device were attached prior to the first radio link failure and the second radio link failure, respectively;
    based on the communication session information, assigning an attachment priority to the first mobile device and the second mobile device; and
    based on the first radio link failure, the second radio link failure, and the assigned attachment priority, delaying authentication of the first mobile device and the second mobile device such that authentication is initiated subsequent to attaching the first mobile device and the second mobile device to the second control component according to the assigned attachment priority.

11. The computer-readable media of claim 10, wherein receiving the communication session information associated with the first radio link failure and the second radio link failure comprises:
    receiving a first message from the first mobile device including the identity associated with the first control component, a first quality of service associated with the first mobile device, and a first connection category associated with the first mobile device; and
    receiving a second message from the second mobile device including the identity associated with the first control component, a second quality of service associated with the second mobile device, and a second connection category associated with the second mobile device.

12. The computer-readable media of claim 11, wherein the assigning of the attachment priority further comprises:
    assigning a first priority to the first mobile device based on the first connection category;
    assigning a second priority to the second mobile device based on the second connection category, wherein the second priority is lower than the first priority; and
    according to the first priority and the second priority, prioritizing the attaching of the first mobile device and the second mobile device to the second control component such that the first mobile device is attached to the second control component before the second mobile device is attached to the second control component.

13. The computer-readable media of claim 11, wherein:
    the first quality of service is based on at least one of a first service being utilized by the first mobile device when the first radio link failure occurs and a first carrier associated with the first mobile device, and
    the second quality of service is based on at least one of a second service being utilized by the second mobile device when the second radio link failure occurs and a second carrier associated with the second mobile device.

14. A system for delaying authentication of a mobile device after a radio link failure occurs, the system comprising:
    a management component; and
    a current control component that:
    receives a first message from the mobile device, the first message including an indication of the radio link failure at a previous control component and an identity of the previous control component to which the mobile device was attached prior to the radio link failure,
    receives a second message from the management component, the second message including an identity of a network component associated with a communication session at the mobile device prior to the radio link failure, attaches the mobile device to the current control component, and based on the radio link failure, initiates authentication of the mobile device after attaching the mobile device to the current control component in order to provide continuity in the communication session.

15. The system of claim 14, wherein the identity of the network component associated with the communication session comprises at least one of a Serving Gateway and a Packet Data Network Gateway.

16. The system of claim 14, wherein the first message further includes a quality of service and a connection category associated with the mobile device prior to the radio link failure.

17. The system of claim 16, wherein the current control component further:

assigns an attachment priority to the mobile device, the assigned attachment priority being based on the connection category associated with the mobile device, and based on the assigned attachment priority, prioritizes the attaching of the mobile device to the current control component.

18. The system of claim 16, wherein providing continuity in the communication session comprises, after the radio link failure:

associating the mobile device with the network component associated with the communication session at the mobile device prior to the radio link failure, and providing to the mobile device the quality of service associated with the mobile device prior to the radio link failure.

* * * * *